Patented Dec. 16, 1952

2,622,069

UNITED STATES PATENT OFFICE 2,622,069

PROCESS FOR INHIBITING FOAM

Louis T. Monson, Puente, Calif., assignor to Petrolite Corporation, a corporation of Delaware No Drawing. Application August 21, 1950, Serial No. 180,691

19 Claims. (Cl. 252—321)

This invention relates to a process for reducing or destroying foam or inhibiting its formation, in compositions of either aqueous or non-aqueous nature.

Foams occur as undesirable, incidental features in many industrial processes. The theory of their formation is not highly developed; so that hypotheses on which foam reduction or destruction processes might be based are difficult to formulate. As a consequence, foam-destroying agents are usually devised for use in the case of particular foams and are not applicable broadly to foam problems.

I have discovered a novel process of reducing or destroying foams and of preventing their formation, which appears to be relatively general in applicability, in that it may be used on compositions comprising aqueous materials or solutions; on compositions comprising aqueous materials or solutions; on compositions comprising non-aqueous materials, such as hydrocarbon liquids; and on compositions comprising mixtures of aqueous and non-aqueous media. My process consists in subjecting a foaming or potentially-foaming composition to the action of a small proportion of a reagent or anti-foamer of the kind subsequently described, thereby causing the foaming properties of the liquid to be diminished, suppressed or destroyed. In applying my process to the reduction or destruction of a foam, the reagent is poured or sprayed or dripped into the body of foam on top the liquid, as desired; and the foam breaks and is destroyed or reduced, substantially at once, as a consequence of such addition of said reagent. In applying my process to the prevention of foaming, the reagent is admixed, in some predetermined small proportion, with a potentially-foaming liquid, by any desired or suitable procedure. The ability of the system to foam is destroyed or at least materially reduced by such addition of said reagent.

I have found that a broad class of reagents normally thought of as foam-promoting or foam-inducing are actually, when used in small proportions, foam-inhibitors. The use of these reagents for the latter purpose is the subject of the present invention.

Reference is made to United States Patent No. 2,499,365, to De Groote and Keiser, dated March 7, 1950, wherein, for use as demulsifiers for petroleum emulsions, hydrophile oxyalkylated synthetic resins are claimed. Such synthetic resin is one in which the ratio of oxyalkylene groups to structural units is at least 2 to 1 and the alkylene radicals of the oxyalkylene groups are selected from the group consisting of ethylene, propylene, butylene, hydroxypropylene, and hydroxybutylene radicals.

Stated in somewhat greater particularity, such hydrophile synthetic products are oxyalkylation products of (A) an alpha-beta alkylene oxide having not more than 4 carbon atoms and selected from the class consisting of ethylene oxide, propylene oxide, butylene oxide, glycid and methylglycid, and (B) an oxyalkylation-susceptible, fusible, organic-solvent-soluble, water-insoluble synthetic resin; said oxyalkylated synthetic resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each resinic structural unit. Stated in still greater detail, the hydrophile properties of said oxyalkylated synthetic resin are sufficient to produce an emulsion when said oxyalkylated synthetic resin is dissolved in an equal weight of xylene and the xylene solution is shaken vigorously with from one to three volumes of water. The ethylene-oxide-derived products are the preferred reagents of this broad class. The resin to be oxyethylated preferably should have a hydroxyl number of at least 20.

In this specification and appended claims, reference is made to the structural units of resins. Resins are formed by reaction between a polyfunctional material with a second, also polyfunctional, material which supplies a bridging or linking radical, or by homo- or hetero-polymerization or a combination of the two. Thus, in the production of phenol-aldehyde resins, the phenol, whether di-, tri-, or tetrafunctional, serves as the first polyfunctional material and the aldehyde supplies bridging methylene radicals. With resins such as these, the identification of the structural units is easy: they are the units or nuclei of the polyfunctional material with (except for the terminal nuclei) a bridging radical attached thereto.

Identification of structural units is likewise easy in the case of homo-polymers, where each molecule of the single reactant represents a structural unit. In nylon-type resins, identification involves the difficulty of deciding which reactant is the polyfunctional resinogen and which the supplier of the bridging radical; but for the present purpose either may be so regarded, and the structural unit consists of one residue of each type.

In the case of modified phenol resins, such as phenol-naphthalene-aldehyde resins, the identification of structural unit may be somewhat arbitrary; but as used in the present application it will be defined as a combination of the nuclei of two of the reactants, i. e., the residue formed when two of the initially reacting molecules have combined.

Thus, generally speaking, the term "structural unit," as used herein to designate what may be termed the resin segments or building blocks or repeating units or recurring units of the resins, means the residue remaining after the combination of two molecular units of the resin-forming materials which are reacted to form the ultimate resin, each representing the nucleus or residue of a polyfunctional compound. In phenol-aldehyde resins, the unit is a phenolic group plus the methylene bridging group; in polyester resins, the acid residue plus the alcohol residue; in modified phenol-aldehyde resins, the phenolic group plus the aldehyde residue or the phenolic group plus the modifying radical or the modifying radical plus the aldehyde radical; in homo-polymers, the residue of a single molecule of the material polymerized; in urea-formaldehyde-phenol resins, either the phenol group plus the aldehyde group or the urea group plus the aldehyde group; in polycarboxy-polyamine resins, one polycarboxy residue plus one polyamine residue; in polyester resins, one polyacid residue plus one polyalcohol residue, etc.

In many resins produced from two or more reactants, for example, from a difunctional phenol plus an aldehyde, there will be one terminal structural unit (in some cases, more than one) which lacks the bridging radical. It is nevertheless to be regarded as a structural unit.

My broadest class of reagents is this class of materials described and claimed in U. S. Patent No. 2,499,365. I incorporate into this present application by reference the 381 "a" examples, the 98 "b" examples, and the many tabulated examples of that patent, as examples of synthetic resin intermediates and oxyalkylated synthetic resins of my present invention, respectively.

The foam-inhibiting property with which this invention is concerned is found to be not uniformly inherent in all synthetic resin derivatives of the present class. For example, I have found that in general the phenolic resin derivatives are more effective than the non-phenolic resin derivatives. Similarly, within the phenolic-resin-derivative class, I have found that the derivatives of difunctional-monocyclic-phenol resins are generally of superior effectiveness for the present purpose, especially where the substituent in the 2,4,6 position of the phenol is hydrocarbon character, and more especially where the number of carbon atoms in such hydrocarbon substituent lies between 1 and 24.

My most effective and outstanding sub-class of reagents useful in practicing my present process includes the class described and claimed for use as demulsifiers in U. S. Patent No. 2,499,370, to De Groote and Keiser, dated March 7, 1950. The reagents of this patent are hydrophile oxyalklated 2,4,6 $C_4$- to $C_{12}$ - hydrocarbon - substituted monocyclic phenol—$C_1$- to $C_8$-aldehyde resins in which the ratio of oxyalkylene groups to phenolic nuclei is at least 2:1 and the alkylene radicals of the oxyalkylene groups are selected from the class consisting of ethylene, propylene, butylene, hydroxypropylene and hydroxybutylene radicals.

It is to be noted that the reagents of this most effective sub-class are, in all respects save one, identical with those disclosed and claimed by De Groote and Keiser in U. S. Patent No. 2,499,370. This one deviation is that, for the present purpose, I find the present class of derivatives of $C_{14}$-phenols to be the equal of those derived from $C_{12}$-phenols. I therefore include in my present class of useful reagents the oxyalkylated phenolic resins prepared from $C_1$- to $C_8$-aldehydes and $C_4$- to $C_{14}$-phenols, instead of from such aldehydes and $C_4$- to $C_{12}$-phenols.

Stated with somewhat greater particularity, my most effective sub-class of reagents are hydrophile synthetic products which are oxyalkylation products of (A) an alpha-beta alkylene oxide having not more than 4 carbon atoms and selected from the class consisting of ethylene oxide, propylene oxide, butylene oxide, glycid and methylglycid, and (B) an oxyalkylation-susceptible, fusible, organic-solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

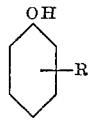

in which R is a hydrocarbon radical having at least 4 and not more than 14 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals and hydroxybutylene radicals, and $n$ is a numeral varying from 1 to 20; with the proviso that at least 2 moles of alkylene oxide be introduced for each phenolic nucleus.

Stated in still greater detail, the hydrophile properties of my said oxyalkylated hydrocarbon-substituted difunctional phenolic resin are sufficient to produce an emulsion when said oxyalkylated phenolic resin is mixed with an equal weight of xylene and the xylene solution is shaken vigorously with from one to three volumes of water. The ethylene-oxide-derived products are the preferred reagents of this most effective sub-class. The phenolic resin is preferably a low-stage resin having an average molecular weight corresponding to from 3 to 7 phenolic nuclei per resin molecule; the aldehyde is preferably an aliphatic aldehyde, and most preferably formaldehyde; and the resinification reaction is preferably acid-catalyzed.

I incorporate into this present application by reference the 103 "a" examples, the 18 "b" examples, and the many tabulated examples of U. S. Patent No. 2,499,370, as examples of synthetic resin intermediates and oxyalkylated synthetic resins of my present invention, respectively.

Of all the reagents included within my invention, I find those prepared by the oxyethylation of phenol-formaldehyde resins made from butyl, amyl, octyl, nonyl, and tetradecyl phenols to be of greatest effectiveness, in the present process. Examples of the preparation of the $C_{14}$-phenolic resins and their oxyalkylated derivatives could be recited here; but it will suffice to state that the resins are prepared exactly like the $C_{12}$-phenol resins of Examples 74a, 187a, 188a of Patent No. 2,449,365; and their oxyalkylated derivatives are prepared from such resins as tabulated or described for the $C_{12}$-phenol resins in that patent.

My present class of oxyalkylated resinous derivatives may be used alone in foam prevention and inhibition, or they may be used in admixture with any other effective and compatible antifoamer, e. g., with the reagents described and claimed in my U. S. Patent No. 2,408,527, dated October 1, 1946, or those described and claimed in my co-pending application, Serial No. 775,145, filed September 19, 1947.

It is usually convenient to dilute my reagents during manufacture or before use with some suitable solvent. Solvents generally suitable for incorporation into my reagent include: water; petroleum hydrocarbons, like gasoline, kerosene, stove oil, aromatic solvent; coal tar products, such as benzene, toluene, xylene, tar acid oil, cresol, anthracene oil; alcohols, particularly aliphatic alcohols like methyl, ethyl, isopropyl, butyl, hexyl, octyl, etc. Miscellaneous solvents, such as pine oil, carbon tetrachloride, etc., may be employed. Sometimes other factors such as whether it imparts an objectionable odor to the defoamed composition or to the products into which it finds its way will determine the choice of solvent. In general, the amounts of finished anti-foamer reagent employed are so small that considerable tolerance of undesirable properties in a solvent exists.

The mixture of active ingredients and solvents is stirred until homogeneous. I prefer to employ a petroleum distillate in the proportion of 25 to 50% of the finished product, by volume, although water is an excellent solvent in some instances.

As specific examples of my finished antifoamers the following may be recited:

Example 1

Prepare an amyl phenol-formaldehyde resin by reacting at atmospheric pressure molal proportions of commercial forms of these two reactants in the presence of an equal weight of an inert solvent like aromatic petroleum solvent, and an acid catalyst such as sulfuric acid, until the theoretical amount of water of reaction plus the water originally present in the 37% formaldehyde used has been evolved. Then, add sodium hydroxide to alkaline reaction and introduce 3 moles of ethylene oxide for each mole of phenol present, the temperature being about 165° C. and the pressure not exceeding about 50 p. s. i. The resulting product is an effective anti-foamer. (If desired, a product of this character may be prepared as recited in Examples 3a and 5b of U. S. Patent 2,499,370.)

Example 2

Prepare a butyl phenol-formaldehyde resin by reacting at atmospheric pressure molal proportions of commercial forms of these two reactants in the presence of an equal weight of an inert solvent like aromatic petroleum solvent, and an acid catalyst such as sulfuric acid, until the theoretical amount of water of reaction plus the water originally present in the 37% formaldehyde has been evolved. Then make alkaline with sodium hydroxide and introduce 3 moles of ethylene oxide for each mole of phenol present, the temperature being about 165° C. and the pressure not exceeding about 50 p. s. i. Thereafter, introduce 6 moles of propylene oxide under the same conditions. (Actually, the charge is not removed from the autoclave; the ethylene oxide feed is simply stopped and the propylene oxide feed is started.) Thereafter, introduce 2 more moles of ethylene oxide. The resulting product is an effective anti-foamer.

Example 3

Molal proportions of commercial octyl phenol and commercial formaldehyde are reacted in the presence of an equal weight of an inert solvent like aromatic petroleum solvent, and an acid catalyst like sulfuric acid until the theoretical amount of water of reaction and solution has been evolved. The product is made alkaline and 5 moles of ethylene oxide are introduced for each mole of phenol present. The temperature during oxyethylation is about 165° C. and the pressure ranges below about 50 p. s. i. The product is an effective anti-foamer.

I desire to point out that the superiority of the reagent contemplated in my process is based upon its ability to reduce or destroy foam, or to prevent foam formation, in certain foaming or potentially foaming compositions more advantageously and at lower cost than is possible with other reagents or processes. In certain instances, it has been found to destroy or reduce foams or prevent their formation, which foams were not economically or effectively reducible or preventable by any other known means.

My reagents are useful in controlling foam in many different types of system. For example, use of 25 ml. of a 50% solution, in aromatic petroleum solvent, of the oxyethylated derivative of amyl phenol-formaldehyde resin, prepared as in Examples 3a and 5b of U. S. Patent No. 2,499,370, in 8,000 gallons of an aqueous foaming composition in the manufacture of an alkaline hypochlorite bleaching solution effectively controlled the foaming tendency of the material.

In a second instance, a mixture of oxyethylated butyl phenol-formaldehyde resin and oxyethylated-oxypropylated amyl phenol-formaldehyde resin was used. The butyl phenol-formaldehyde resin and the amyl phenol-formaldehyde resin were prepared according to Examples 1a and 3a of U. S. Patent No. 2,499,370, respectively. The butyl phenol resin was oxyethylated in the conventional manner, using 3 moles of ethylene oxide for each phenolic hydroxyl (as determined by Verley-Bölsing hydroxyl number determination). The amyl phenol resin was oxyalkylated by first introducing 3 moles of ethylene oxide in the conventional manner, and then 3 moles of propylene oxide. Equal parts by weight of these oxyalkylated derivatives of phenolic resins were then diluted with enough petroleum distillate to make the finished reagent 50%-active. The reagent was used to control foaming in a foaming diesel fuel, the proportion of reagent employed being about 1 part to 5,000.

In a third application of my process, the reagent employed was a mixture of oxyethylated amyl phenol-formaldehyde resin, oxyethylated-oxypropylated amyl phenol-formaldehyde resin, the basic acylated aminoalcohol described and claimed as the preferred example of my U. S.

Patent No. 2,408,527, dated October 1, 1946, and drastically blown mixed castor and soybean oils of the kind described and claimed as ingredients in the reagents used in my application Serial No. 775,145, filed September 19, 1947. The proportions of these ingredients were 8.9 parts of oxyethylated amyl phenol resin, 20.3 parts of oxyethylated-oxypropylated amyl phenol resin, 3.5 parts of acylated aminoalcohol, and 1.2 of blown oil, diluted with 66.1 parts of aromatic petroleum distillates. The foaming system was a mixture of ethanolamines of the kind used to remove acidic constituents from natural gas. Addition of 1 part of the above anti-foaming composition to 25,000 parts of foaming ethanolamines reduced the foam promptly and substantially completely.

I have applied my reagents to the control of foaming in casein adhesive solutions, such as are used in the plywood industry, with notable success. Soybean adhesives likewise respond to the use of small proportions of my reagents. Latex adhesives, printing inks, aqueous emulsion paints, have all responded to applications of reagents of my presently described and claimed class.

In operating the process of my invention, one may add the anti-foaming reagent to the composition having foaming tendencies before foaming occurs, in which case the reagent operates to prevent progressive foam formation; or the reagent may be added to the foaming liquid, in which case it acts to destroy or reduce the foam already present. The reagent may be added undiluted, or diluted by water or some suitable non-aqueous solvent, such as petroleum distillates, etc. In the case of a foaming liquid, it may be most desirable to make a solution or dispersion of my reagent, and spray or sprinkle such solution or dispersion over the head of foam present. If sufficient turbulence exists in the vessel containing the foaming liquid, it may suffice merely to add the undiluted reagent to the system in one operation and at one time. In the case of foam prevention, addition of the reagent to the liquid system may be by any suitable means and injection may be continuous or intermittent, as required. A proportioning pump may be used to inject the reagent into the composition, if desired. In all cases, the proportion of my reagent required to effect foam destruction or reduction, or foam prevention, is only a very small fraction of the volume of liquid present in the foaming or potentially foaming composition.

The effectiveness of my reagent resides in part in the use of proper proportions thereof. The correct amounts to be employed may readily be determined by subjecting any desirable test volumes of the foaming, or potentially foaming, composition to accurately measured small volumes of the reagent, and observing the results of such additions, especially after shaking. Reshaking the container and contents will give the added information as to whether the anti-foamer will prevent or suppress foaming over a period of time. If the proportions of reagent to be employed are very small, it may be desirable to determine the optimum proportions of foaming liquid and anti-foamer by introducing the latter into the sample in the test container, in the form of a solution in a suitable solvent. Such procedure, which increases the accuracy of the addition, requires that a companion test be conducted using an equal volume of solvent, to prove that the effect observed is due to the anti-foamer and not to the solvent in which it was added.

Throughout this specification I have shown that my process is equally applicable to systems in which a foam is already in existence and to systems which are potentially foaming compositions, in that they have the property of producing foams when agitated or mixed with air or some other suitable gas. In the claims appended hereto I have used the word "inhibiting" to include the prevention, the destruction or reduction of foams, on the understanding that destruction, reduction and prevention are substantially identical, it being impossible to determine in the prevention process whether the reagent does, in fact, prevent the formation of the initial laminae of foam, or whether such initial laminae are destroyed by the reagent before subsequent laminae of sufficient stability to produce a foam can be superimposed thereon. By "foaming composition" in such claims, I mean a composition which is either actually foaming, or which is capable of producing a foam under suitable conditions.

In most instances, my reagent is effective to the extent that it destroys an existing foam substantially completely. In some instances, such, for example, as when the proportions of liquid and anti-foamer are quite widely removed from optimum proportions, the foam reduction may be slow, or it may even be incomplete. I intend that this description and my invention relate both to complete destruction and to partial reduction of foams.

The proportions of reagent required to be used appear, as shown by the foregoing examples, to vary widely. However, I wish to limit my invention to the use of amounts of anti-foamer comprising 1% or less of the foaming system. Usually, the amounts required will be between 0.1% and 0.0001%.

Having thus described my invention, what I claim as new and desire to secure by Letters Patent is:

1. A process for inhibiting foam, characterized by subjecting a non-detersive foaming composition to the action of not more than 1% of a reagent including a hydrophile oxyalkylated 2,4,6 $C_1$- to $C_{24}$-hydrocarbon-substituted monocyclic phenol - $C_1$- to $C_8$-aldehyde resin in which the ratio of oxyalkylene groups to phenolic nuclei is at least 2:1 and the alkylene radicals of the oxyalkylene groups are selected from the group consisting of ethylene, propylene, butylene, hydroxypropylene and hydroxybutylene radicals.

2. A process for inhibiting foam, characterized by subjecting a non-detersive foaming composition to the action of not more than 1% of a reagent including a hydrophile oxyalkylated 2,4,6 $C_4$- to $C_{14}$-hydrocarbon-substituted monocyclic phenol - $C_1$- to $C_8$-aldehyde resin in which the ratio of oxyalkylene groups to phenolic nuclei is at least 2:1 and the alkylene radicals of the oxyalkylene groups are selected from the class consisting of ethylene, propylene, butylene, hydroxypropylene and hydroxybutylene radicals.

3. A process for inhibiting foam, characterized by subjecting a non-detersive foaming composition to the action of not more than 1% of a reagent including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic - solvent - soluble, water-insoluble phenol-aldehyde resin; said resin being derived by reaction between a difunctional monohydric phenol and an aldehyde having not over 8 carbon atoms and reactive toward said phenol, said resin being formed in the substantial absence of phenols of functionality greater than two; said phenol being of the formula

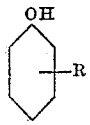

in which R is a hydrocarbon radical having at least 4 and not more than 14 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

4. A process for inhibiting foam, characterized by subjecting a non-detersive foaming composition to the action of not more than 1% of a reagent including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic - solvent - soluble, water-insoluble phenol-aldehyde resin; said resin being derived by reaction between a difunctional monohydric phenol and an aldehyde having not over 8 carbon atoms and reactive toward said phenol; said resin being formed in the substantial absence of phenols of functionality greater than two; said phenol being of the formula

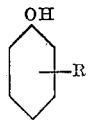

in which R is a hydrocarbon radical having at least 4 and not more than 14 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

5. A process for inhibiting foam, characterized by subjecting a non-detersive foaming composition to the action of not more than 1% of a reagent including hydrophile synthetic products; said hydrophile synthetic products being oxyethylation products of (A) ethylene oxide, and (B) an oxyethylation-susceptible, fusible, organic-solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of phenols of functionality greater than two; said phenol being of the formula

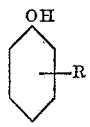

in which R is a hydrocarbon radical having at least 4 and not more than 14 carbon atoms and substituted in the 2,4,6 positions; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

6. A process for inhibiting foam, characterized by subjecting a non-detersive foaming composition to the action of not more than 1% of a reagent including hydrophile synthetic products; said hydrophile synthetic products being oxyethylation products of (A) ethylene oxide, and (B) an oxyethylation-susceptible, fusible, organic-solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than two; said phenol being of the formula

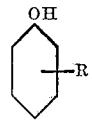

in which R is a hydrocarbon radical having at least 4 and not more than 14 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

7. A process for inhibiting foam, characterized by subjecting a non-detersive foaming composition to the action of not more than 1% of a reagent including hydrophile synthetic products; said hydrophile synthetic products being oxyethylation products of (A) ethylene oxide, and (B) an oxyethylation-susceptible, fusible, organic-solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than two; said phenol being of the formula

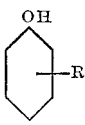

in which R is an aliphatic hydrocarbon radical having at least 4 and not more than 14 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

8. A process for inhibiting foam, characterized by subjecting a non-detersive foaming composition to the action of not more than 1% of a reagent including hydrophile synthetic products; said hydrophile synthetic products being oxyethlation products of (A) ethylene oxide, and (B) an oxyethylation-susceptible, fusible, organic-solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aliphatic aldehyde having not over 8 carbon atoms and reactive toward said phenol; said resin being formed in the substantial absence of phenols of functionality greater than two; said phenol being of the formula

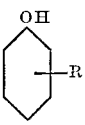

in which R is an aliphatic hydrocarbon radical having at least 4 and not more than 14 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

9. A process for inhibiting foam, characterized by subjecting a non-detersive foaming composition to the action of not more than 1% of a reagent including hydrophile synthetic products; said hydrophile synthetic products being oxyethylation products of (A) ethylene oxide; and (B) an oxyethylation-susceptible, fusible, organic-solvent-soluble, water-insoluble, low-stage phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula

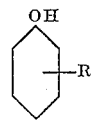

in which R is an aliphatic hydrocarbon radical having at least 4 and not more than 14 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

10. A process for inhibiting foam, characterized by subjecting a non-detersive foaming composition to the action of not more than 1% of a reagent including hydrophile synthetic products; said hydrophile synthetic products being oxyethylation products of (A) ethylene oxide, and (B) an oxyethylation-susceptible, fusible, organic-solvent-soluble, water-insoluble, low-stage, acid-catalyzed phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two, said phenol being of the formula

in which R is an aliphatic hydrocarbon radical having at least 4 and not more than 14 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

11. The process of claim 10, wherein R is a butyl radical.

12. The process of claim 10, wherein R is an amyl radical.

13. The process of claim 10, wherein R is an octyl radical.

14. The process of claim 10, wherein R is a nonyl radical.

15. The process of claim 10, wherein R is a tetradecyl radical.

16. A process for inhibiting foam, characterized by subjecting a non-detersive foaming composition to the action of not more than 1% of a hydrophile oxyalkylated synthetic resin; said synthetic resin being one in which the ratio of oxyalkylene groups to structural units is at least 2 to 1 and the alkylene radicals of the oxyalkylene groups are selected from the group consisting of ethylene, propylene, butylene, hydroxypropylene and hydroxybutylene radicals.

17. A process for inhibiting foam, characterized by subjecting a non-detersive foaming composition to the action of not more than 1% of a hydrophile oxyalkylated phenolic resin; said phenolic resin being one in which a phenol supplies a resinogen radical by virtue of a nuclear hydrogen atom; said resin being one in which the ratio of oxyalkylene groups to phenolic nuclei is at least 2:1 and the alkylene radicals of the oxyalkylene groups are selected from the group consisting of ethylene, propylene, butylene, hydroxypropylene and hydroxybutylene radicals.

18. A process for inhibiting foam, characterized by subjecting a foaming protein adhesive composition to the action of not more than 1% of a hydrophile oxyalkylated synthetic resin; said synthetic resin being one in which the ratio of oxyalkylene groups to structural units is at least 2 to 1 and the alkylene radicals of the oxyalkylene groups are selected from the group consisting of ethylene, propylene, butylene, hydroxypropylene and hydroxybutylene radicals.

19. A process for inhibiting foam, characterized by subjecting a foaming protein adhesive composition to the action of not more than 1% of a hydrophile oxyalkylated phenolic resin; said phenolic resin being one in which a phenol supplies a resinogen radical by virtue of a nuclear hydrogen atom; said resin being one in which the ratio of oxyalkylene groups to phenolic nuclei is at least 2:1 and the alkylene radicals of the oxyalkylene groups are selected from the group consisting of ethylene, propylene, butylene, hydroxypropylene and hydroxybutylene radicals.

LOUIS T. MONSON.

REFERENCES CITED

The following references are of record in the file of this patent:

UNITED STATES PATENTS

| Number | Name | Date |
| --- | --- | --- |
| 2,425,755 | Roberts, et al. | Aug. 19, 1947 |
| 2,454,541 | Bock et al. | Nov. 23, 1948 |
| 2,454,544 | Bock et al. | Nov. 23, 1948 |
| 2,499,365 | De Groote et al. | Mar. 7, 1950 |
| 2,499,370 | De Groote et al. | Mar. 7, 1950 |

OTHER REFERENCES

Chemical Industries, May 1949, pp. 757–759, Ross, "Chemical Antifoaming Agents."